Dec. 23, 1941.   W. E. CARROLL   2,267,583
GAUGE MOUNTING DEVICE
Filed Dec. 6, 1940
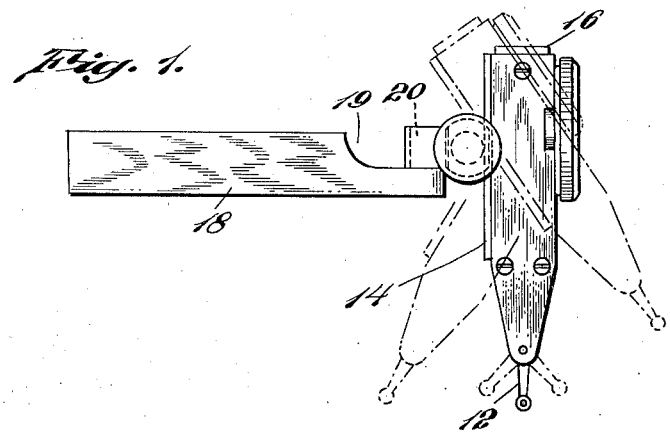
Fig. 1.
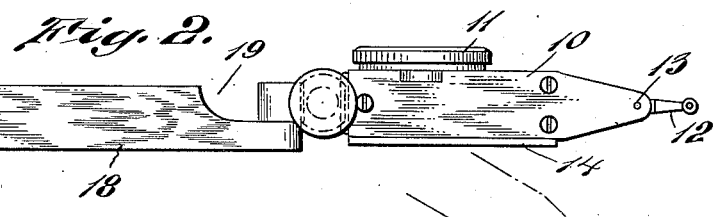
Fig. 2.
Fig. 3.   Fig. 4.
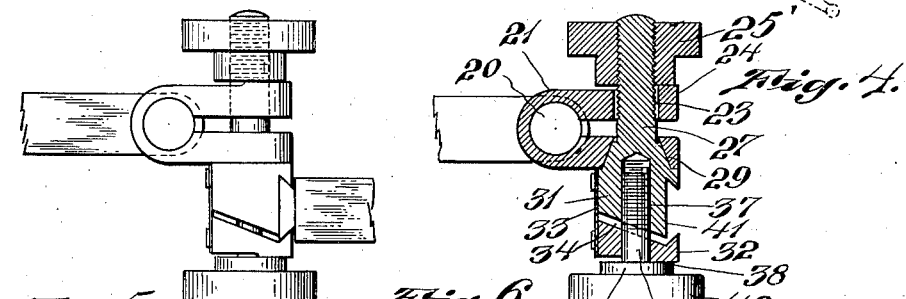
Fig. 5.   Fig. 6.   Fig. 7.
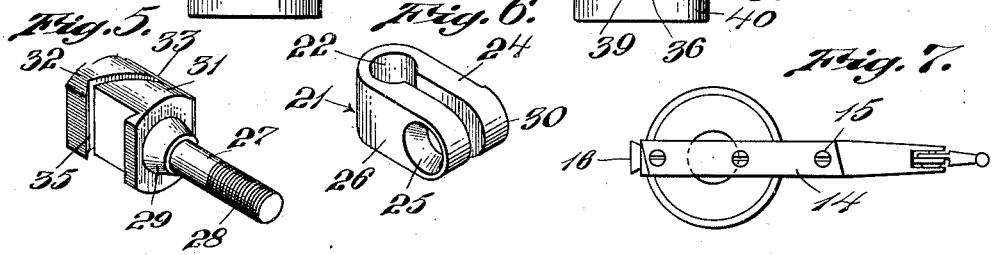
Fig. 8.
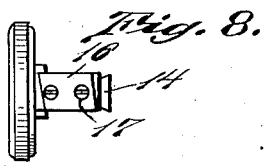
INVENTOR.
William E. Carroll
BY Barlow & Barlow
ATTORNEYS.

Patented Dec. 23, 1941

2,267,583

UNITED STATES PATENT OFFICE 2,267,583

GAUGE MOUNTING DEVICE

William E. Carroll, East Providence, R. I., assignor to Federal Products Corporation, a corporation of Rhode Island Application December 6, 1940, Serial No. 368,834

4 Claims. (Cl. 287—103)

This invention relates to a gauge and more particularly to the mounting of the gauge in operating position. One of the objects of the invention is to provide the mounting of a height gauge in a manner providing for universal movement of the gauge.

Another object of the invention is the mounting of the gauge in such a variety of positions that obstruction to the operating finger may be avoided.

Another object of the invention is to provide for a more secure clamping of the gauge on its mounting device.

Another object of the invention is to provide a greater clamping surface for securing the gauge in position.

With these and other objects in view, the invention consists of certain novel features of construction, as will be more fully described, and particularly pointed out in the appended claims.

In the accompanying drawing:

Fig. 1 is a side elevation illustrating the mounting arm, clamp and the gauge as supported by the clamp, and illustrating in dotted lines various positions to which the gauge may be moved;

Fig. 2 is a view illustrating a still different arrangement of mounting the gauge body in position, and in dotted lines a different position to which it may be moved;

Fig. 3 is a top plan view of the clamp and gauge as shown in Fig. 2, showing both the arm and gauge fragmentally;

Fig. 4 is a central sectional view through the clamp, as shown in Fig. 3;

Fig. 5 illustrates one unit of the clamp;

Fig. 6 illustrates another unit of the clamp;

Fig. 7 illustrates a bottom plan view of the gauge; and

Fig. 8 illustrates an end view of the gauge, showing the two dove-tail gibs which are associated with the body of the gauge.

In the use of a height gauge the mounting of this gauge is of importance both from the standpoint of holding this gauge securely in position and of providing for adjustment of the gauge so as to avoid various obstacles which may occur by reason of the shape of the work or other conditions under which the gauge is being used, and in order that a mounting will be substantially universal and yet the gauge body held securely in position, I have arranged a clamp having a dove-tail slot and have so contracted this slot that a maximum holding pressure will be provided, and I have arranged the body of the gauge with a gib to fit the slot and have fixed these gibs at such locations on the gauge body that a minimum of adjustment and positioning of the gauge may be had; and the following is a more detailed description of the present embodiment of this invention, illustrating the preferred means by which these advantageous results may be accomplished:

With reference to the drawing, 10 designates the body or casing portion of a gauge having a dial 11 thereon and a contact or feeler finger 12 pivotally located as at 13 in the body and arranged for operation of a hand which rotates over the dial in response to the amount of movement of the feeler finger 12. This body 10 is provided with a dove-tail gib 14 extending along one edge wall of the body and secured thereto by screws 15, while a second dove-tail gib 16 is provided across the end of the body 10 and secured thereto by screws 17 (see particularly Fig. 7 and Fig. 8).

The mounting for this gauge consists of an arm 18 cut down as at 19 for clearance and having an internal circular post 20 extending upwardly from the end thereof. A clamp comprising a U-shaped bifurcated part 21 has an opening 22 in the bite of the U to receive the post 20 and an opening 23 in the arm 24 and a conical opening 25 in the arm 26. A member, as shown in Fig. 5, has a stud portion 27 threaded as at 28 and a frustro-conical portion 29 to fit the conical opening 25 and extend through the opening 23 in the arm 24 where it is engaged by a nut 25' which engages the enlarged end as at 30 of the arm 24 to provide greatest leverage for contracting the arms 24 and 26 to securely bind the member 21 upon the post 20.

The other portion of this member Fig. 5 consists of a body piece 31 and a movable jaw piece 32 which is secured to the body piece 31 by a leaf spring 33, spacing these to provide a slot 34 between these parts which are shaped to provide a groove 35 having undercuts on the parts 31 and 32 to form a dovetail slot for the reception of the dove-tail gibs either 14 or 16 on the gauge body. An opening is provided through the jaw 32 for the reception of a threaded stud 36 which has threaded engagement as at 37 with the part 31. The end of the jaw 32 is enlarged as at 38 for engagement with the collar 39 of the bolt beneath the head 40 thereof so that as the bolt is turned inwardly the jaw 32 will be engaged at its extremity or the point of greatest leverage, to swing about its hinge 33 and move the jaw 32 not only inwardly but also downwardly so as to bind the gib against the bottom 41 of the dove-tail slot for more firm engagement by contact with a greater surface than were a mere contracting action provided.

By the construction above illustrated, it will be apparent that by loosening the nut 25' the entire member 26 may be rotated to swing the gauge into different positions, as illustrated in dotted lines in Fig. 1, while at the same time by a rotary movement about the post 20, this gauge may be swung in a plane at right angles thereto. Further, if it is required that the gauge reach out to a substantial extent, the gib 16 may be utilized as illustrated in Fig. 2 to project the gauge as there illustrated, and this gauge may be swung through the arc with the member 26 as a center, as shown by dotted lines in Fig. 2 and may also be swung around the post 20. It will also be apparent that various heights of the gauge may be provided in any of these different locations by the adjustment of the gib through the dove-tail slot 35.

I claim:

1. A gauge and mounting comprising a gauge having a body with right angular walls and dove-tail gibs extending along each of two right angular extending walls, a clamp having means to engage a support, a dove-tail slot to engage one of said gibs, and means to contract said slot and bind the said gib therein.

2. A gauge and mounting comprising a gauge having a body with a dove-tail gib extending along one of the exterior walls thereof, a clamp having means to engage a support, a dove-tail slot to engage said gib, the walls of said slot being connected by a leaf spring, and means to contract said slot and bind the said gib against the bottom of said slot.

3. A gauge and mounting comprising a gauge having a body with a gib extending along one of the exterior walls thereof, a clamp having means to engage a support and provided with a slot to engage said gib, the walls of said slot being connected by a leaf spring, and means to contract said slot and bind the said gib therein.

4. A gauge and mounting comprising a gauge having an elongated body provided with a gib extending along one of the exterior walls thereof, means to rotatably mount said gauge to a support comprising a clamp element rotatably engaging said support and having aligned openings extending therethrough, a second clamp element having a slot therein for receiving said gib, and a portion thereof extending through and rotatable in said aligned openings, means to contract said slot and bind said gib therein, and means including the said portion extending through the aligned openings for rotatably mounting said clamp elements to each other and to said support.

WILLIAM E. CARROLL.